Oct. 15, 1968  G. R. WALKER  3,405,959
FLUID SEALING MEANS
Filed March 16, 1965
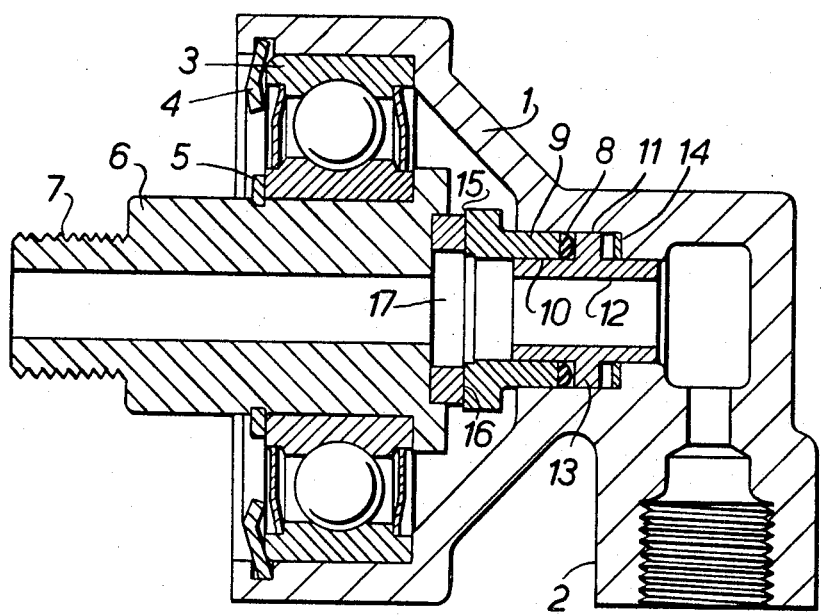
Inventor
Gordon Richard Walker
By Cushman, Darby & Cushman
Attorneys United States Patent Office 3,405,959
Patented Oct. 15, 1968

3,405,959
FLUID SEALING MEANS
Gordon Richard Walker, Southam, England, assignor to Filton Limited, Leamington Spa, England
Filed Mar. 16, 1965, Ser. No. 440,181
3 Claims. (Cl. 285—276)

ABSTRACT OF THE DISCLOSURE

An apparatus incorporating fluid sealing means between relatively rotatable casing and shaft parts thereof, e.g., to apparatus such as rotary unions of the kind used for connecting a fluid-conveying conduit to the interior of a continuously rotating body such as a roll, the sealing means comprising a composite sealing ring composed of a ring of elastically deformable material, more particularly one of D-section, bonded to one end of a relatively rigid elongated ring which forms one element of a rotary sliding contact seal; the composite ring being located in an annular groove formed by the casing part and an axially floating member which exerts axial thrust on the composite ring: the elastically deformable ring engaging the bottom of the groove and the relatively rigid part of the composite ring making a sliding fit with the side walls of the groove ahead of the deformable ring, the deformed ring sealing off the floating member and the casing part when the composite contact-seal ring is making the contact seal.

---

The present invention relates to apparatus incorporating fluid sealing means between relatively rotatable parts thereof, e.g., to apparatus such as rotary unions of the kind used for connecting a fluid-conveying conduit to the interior of a continuously rotating body such as a roll.

The invention has as its object to provide sealing means which will enable such apparatus to be manufactured without the need for bellows, diaphragms and the like and which will accordingly enable such apparatus to be economically manufactured.

To this end there is provided according to the present invention apparatus incorporating fluid sealing means between relatively rotatable parts thereof, said sealing means comprising a composite sealing ring composed of a ring of elastically deformable material and a ring of non-yielding material which forms one element of a rotary sliding contact seal bonded together in axial alignment, the said composite ring being located in an annular groove formed by one of said parts and a member adapted to exert axial thrust on the composite ring, the said groove receiving the elastically deformable ring and part of the non-yielding ring with the elastically deformable ring seated on the bottom of the groove and deformed in such groove by the axial thrust so that it makes gripping sealing contact with the walls of the groove and elastically presses the non-yielding ring, which ring makes a sliding fit between the side walls of the groove, into sealing contact with the sealing face of the co-operating element of the contact seal carried by the other of said parts.

The said thrust member may be a bush or sleeve having an external collar which forms the bottom of said groove. Spring or other resilient means may be provided which acts on the said collar.

The said elastically deformable ring may be of natural or synthetic rubber or silicone elastomer having low or high shore hardness according to the conditions of use and may be of any suitable cross-section such, e.g., as of D-section. The non-yielding ring may be formed from a suitable metallic material such as stainless steel. The said co-operating element may be of carbon.

It will readily be appreciated that due to the axial thrust the said deformable ring will be deformed into gripping sealing contact with the walls of the groove while the contact seal ring bonded thereto is resiliently pressed against the co-operating element of the contact seal.

In order that the invention may be the more readily understood reference will hereinafter be made by way of example to the accompanying drawing which shows in cross-sectional elevation a rotary union according to the invention.

The rotary union illustrated comprises a casing 1 having an elbow 2 whereby the union can be connected, e.g., to a fluid-conveying conduit and permit the fluid to pass axially through the union. Mounted in the casing 1 is a grease-sealed bearing 3 which is maintained in position by an outward springing circlip 4 and an inward springing circlip 5 and is mounted on a hollow shaft 6. The shaft 6 is provided with a screw-threaded spigot 7 whereby it can be connected, e.g., to a continuously rotating body such as a roll.

The means for providing a rotary sliding contact seal between the relatively rotating casing 1 and shaft 6 comprises a composite sealing ring composed of a ring 8 of elastically deformable material and a ring 9 of non-yielding material bonded together in axial alignment, the said composite ring being located in an annular groove 10 formed by an interior cylindrical wall 11 of the casing 1 and a thrust member 12 in the form of a sleeve or bush having an exterior collar 13 which co-operates with the said wall 11 of the casing 1 to form the said groove 10. A spring e.g., a corrugated spring designed to apply a uniform pressure on the sleeve or bush or other resilient means 14 acts on the said collar 13 so that this exerts axial thrust on the composite ring whilst this is frictionally retained in relation to the casing. The ring 9 is provided with a smooth, e.g., lapped, sealing face 15 adapted to make rotary sliding sealing contact with a sealing face 16 of a ring 17 secured, e.g., soldered or adhered, to the shaft 6 and adapted to rotate therewith.

In the illustrated embodiment the deformable ring 8 is of synthetic rubber of low or high Shore hardness according to the conditions of use and is of D-section and the non-yielding ring 9 is of stainless steel or the like. The ring 17 is of carbon or like low friction material.

The composite ring is designed to provide hydraulic balancing of the contact seal in known manner.

What I claim is:
1. Apparatus incorporating fluid sealing means between relatively rotatable casing and shaft parts thereof, said sealing means comprising a composite sealing ring composed of a ring of elastically deformable material and a relatively rigid elongated ring which forms one element of a rotary sliding contact seal and are bonded together in axial alignment, the said composite ring being located in an annular groove formed by said casing part, and an axially floating member adapted to exert axial thrust on the composite ring, the said groove receiving the elastically deformable ring and part of the relatively rigid ring with the elastically deformable ring seated on the bottom of the groove and deformed in such groove by the axial thrust so that it makes gripping sealing contact with the walls of the groove and elastically presses the relatively rigid ring, which ring makes a sliding fit between the side walls of the groove between the elastically deformable ring and the open end of the groove, into sealing contact with the sealing face of the co-operating element of the contact seal carried by the other of said parts.

2. Apparatus according to claim 1, wherein said elastically deformable ring is of D-section.

3. Apparatus according to claim 1, said apparatus being a rotary union and said member being a sleeve through which the fluid passes and having a collar forming the bottom of the said groove and being axially urged by a spring bearing against an internal shoulder on the casing.

References Cited

UNITED STATES PATENTS

| | | | |
|---|---|---|---|
| 2,305,725 | 12/1942 | Meyer | 285—281 |
| 2,331,615 | 10/1943 | Meyer | 285—276 |
| 2,498,915 | 2/1950 | Espegren | 285—375 X |
| 2,531,021 | 11/1950 | Bard | 285—276 |
| 2,723,136 | 11/1955 | Deubler | 285—276 X |
| 2,797,108 | 6/1957 | Royer | 285—281 X |
| 3,058,761 | 10/1962 | Christophersen | 285—281 |
| 2,503,086 | 4/1950 | Albright | 277—87 |

EDWARD C. ALLEN, *Primary Examiner.*

THOMAS F. CALLAGHAN, *Assistant Examiner.*